United States Patent [19]

Hayashi et al.

[11] Patent Number: 4,770,509

[45] Date of Patent: Sep. 13, 1988

[54] ZOOM LENS COMPRISING TWO GROUPS OF LENSES

[75] Inventors: Kiyoshi Hayashi, Yokohama; Yutaka Iizuka, Fujisawa, both of Japan

[73] Assignee: Nippon Kogaku K. K., Tokyo, Japan

[21] Appl. No.: 777,222

[22] Filed: Sep. 18, 1985

[30] Foreign Application Priority Data

Sep. 28, 1984 [JP] Japan .................. 59-203546
Dec. 27, 1984 [JP] Japan .................. 59-278285

[51] Int. Cl.⁴ ............................ G02B 15/177
[52] U.S. Cl. ............................ 350/426
[58] Field of Search .......... 350/426, 423, 427

[56] References Cited

U.S. PATENT DOCUMENTS

| | | | |
|---|---|---|---|
| 4,074,931 | 2/1978 | Okudaira | 350/426 |
| 4,153,338 | 5/1979 | Fujii | 350/426 |
| 4,155,629 | 5/1979 | Nakamura | 350/426 |
| 4,190,323 | 2/1980 | Ogawa et al. | 350/426 |
| 4,266,860 | 5/1981 | Kayashi | 350/426 |
| 4,367,927 | 1/1983 | Fujii | 350/426 |
| 4,380,375 | 4/1983 | Mogami | 350/426 |
| 4,406,523 | 9/1983 | Sato et al. | 350/426 |
| 4,523,813 | 6/1985 | Ogata | 350/426 |
| 4,647,160 | 3/1987 | Ikemori | 350/426 |

*Primary Examiner*—John K. Corbin
*Assistant Examiner*—Scott J. Sugarman
*Attorney, Agent, or Firm*—Shapiro and Shapiro

[57] ABSTRACT

A zoom lens comprises, in the order from the object side, a first diverging group of lenses and a second convergent group of lenses. The first and second groups of lenses are movable along the optical axis to effect zooming. The first group comprises, in the order from the object side, a negative meniscus lens having its convex surface faced to the object side, a negative lens and a positive lens having its surface of larger curvature faced to the object side. The second group of lenses comprises, in the order from the object side, a positive lens, a positive lens formed by a single lens or a combination of cemented positive and negative lenses and functioning as an achromatic lens, a negative lens having its surface of larger curvature faced to the image side and a positive lens. The zoom lens satisfies certain conditions.

14 Claims, 2 Drawing Sheets

ZOOM LENS COMPRISING TWO GROUPS OF LENSES

BACKGROUND OF THE INVENTION

1. Field of the Invention

The present invention relates to a zoom lens comprising two groups of lenses, a diverging group of lenses and a converging group of lenses which are arranged in sequence starting from the side of an object.

2. Description of the Prior Art

For 35 mm still cameras, it appears that the standard 50 mm lens has been replaced completely by such a two-lens-group type zoom lens having the standard field angle and a zoom ratio equal to about two. Such a type of zoom lens is frequently carried as a common lens mounted on the body of a camera. Since the camera body is being made more compact, the zoom lens must be compact correspondingly. It appears that the zoom lens comprising two groups of positive and negative lenses is most suitable for realizing a zoom lens that is more compact and inexpensive while maintaining its imaging performance at a sufficient level.

Various proposals to miniaturize such a two-lens-group type zoom lens have been made, for example, as disclosed in U.S. Pat. No. 4,190,323. When the following relationship is satisfied:

$$f_1 = -\sqrt{f_w \cdot f_T}$$

where $f_1$ is the focal length in a diverging group of lenses, $f_w$ is the focal length at the wide-angle end and $f_T$ is the focal length at the telephoto end, the total length TLw at the wide-angle end becomes equal to the total length $TL_T$ at the telephoto end. Therefore, the entire lens system can be miniaturized with the optimum balance. At the same time, if the focal length in a convergent group of lenses is decreased, the entire lens system can be made correspondingly compact. When refractive powers are selected for the lenses, however, each group of lenses would be provided with a relatively strong power. This results in increasing the number of lenses in each group and provides a complicated lens system. In addition, since there is the following relationship:

$$f_T = f_1 \cdot \beta_T$$

where $\beta_T$ is the magnification in the convergent group of lenses as the second group, the convergent group of lenses will be used beyond one-time magnification at the telephoto end. When it is particularly wanted to correct the spherical aberration, the number of lenses in the second group must be increased. The increase of thickness in each of the groups of lenses tends to cancel advantages in minaturization.

On the contrary, if as disclosed in U.S. Pat. No. 4,380,375, the focal length $f_1$ is increased to provide the following relationship:

$$0 > \beta_T > -1,$$

that is, for the absolute value of the magnification in the convergent group of lenses as the second group to be smaller than on-time magnification, the number of lenses in each of the lens groups can be decreased to reduce the thickness of each lens group. However, such an arrangement is disadvantageous in that the total length of the telephoto end is decreased while the total length at the wide angle end is substantially increased.

SUMMARY OF THE INVENTION

In view of the above problems, it is an object of the present invention to provide a two-lens-group type zoom lens which has a simple and compact construction while maintaining its superior performance.

The zoom lens constructed in accordance with the present invention is a miniaturized and highperformance zoom lens comprising two simple groups of negative and positive lenses, which is realized by satisfying the following relationship:

$$f_1 \approx -\sqrt{f_w \cdot f_T}$$

where $f_w$ is the focal length at the wide-angle end, $f_T$ is the focal length at the telephoto end and $f_1$ is the focal length of the group of diverging lenses, and by the discovery of an effective condition of aberrational correction while providing a diverging group of lenses including three negative, negative and positive lenses and a convergent group of lenses including four or five positive, positive, negative and positive lenses.

The present invention provides a zoom lens comprising, in sequence starting from the side of an object, a first diverging group of lenses and a second convergent group of lenses, the first and second groups of lenses being movable along the optical axis to perform zooming, the first group of lenses comprising, in sequence starting from the side of the object, a negative meniscus lens having its convex surface faced to the object side, a negative lens and a positive lens having its surface of larger curvature faced to the object side, and the second group of lenses comprising, in sequence starting from the side of the object, a positive lens, a positive lens formed by a single lens or a combination of cemented positive and negative lenses and functioning as an achromatic lens, a negative lens having its surface of larger curvature faced to the side of an image and a positive lens, and the zoom lens satisfying the following conditions:

$$0.25 < D_1/|f_1| < 0.32$$

$$0.70 < f_{L1}/f_1 < 1.2$$

$$0.1 < f_{L4}/f_2' < 0.6$$

where
$f_1$ is the focal length of the first lens group;
$f_2'$ is the focal length of the second lens group except the first lens from the side of the object;
$D_1$ is the distance between the forwardmost and rearwardmost lens faces in the first lens group;
$f_{L1}$ is the focal length of the negative meniscus lens in the first lens group; and
$f_{L4}$ is the focal length of the positive lens in the second lens group which is near the side of the object.

DETAILED DESCRIPTION OF PREFERRED EMBODIMENTS

Figure 1:
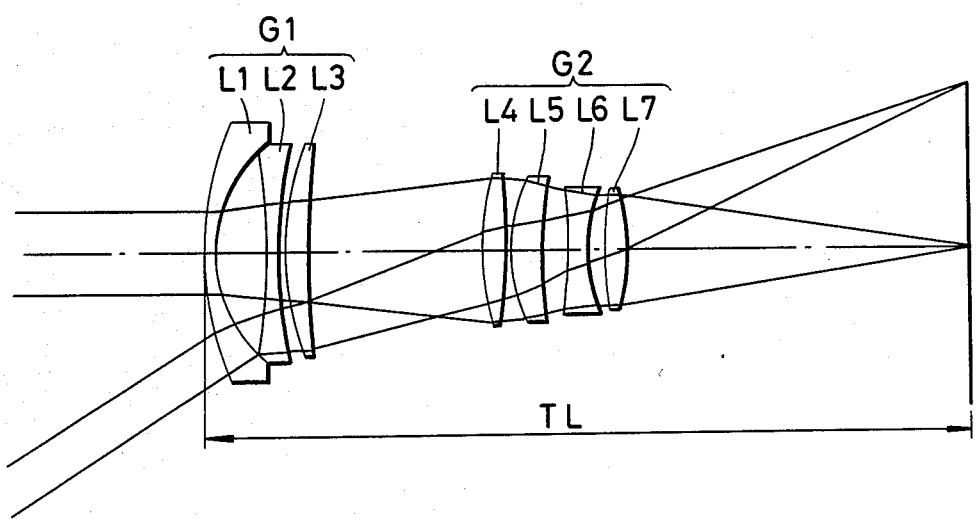
FIG. 1 is a optical diagram of a first embodiment of a lens system constructed in accordance with the present invention.

A zoom lens according to the present invention comprises, in sequence starting from the side of an object, a first diverging group of lenses G1 and a second convergent group of lenses G2, the first and second groups of lenses being movable along the optical axis to perform zooming, the first group of lenses comprising, in sequence starting from the side of the object, a negative meniscus lens L1 having its convex surface faced to the side of the object, a negative lens L2 being concave on the opposite sides and a positive lens L3 having its surface of larger curvature faced to the side of the object, and the second group of lenses comprising, in sequence starting from the side of the object, a positive lens L4 being convex on the opposite sides, a positive lens L5 of a single lens body or bonded positive and negative lenses elements and serving as an achromatic lens, a negative lens L6 having its surface of larger curvature faced to the side of an image and a positive lens L7. The zoom lens also satisfies the following conditions:

$$0.25 < D_1/|f_1| < 0.32 \quad (1)$$

$$0.70 < f_{L1}/f_1 < 1.2 \quad (2)$$

$$0.1 < f_{L4}/f_2' < 0.6 \quad (3)$$

where $f_1$ is the focal length of the first lens group;

$f_2'$ is the combined focal length of the lenses L5, L6 and L7 in the second lens group;

$D_1$ is the distance between the forwardmost and rearwardmost lens faces in the first lens group;

$f_{L1}$ is the focal length of the negative meniscus lens in the first lens group; and $f_{L4}$ is the focal length of the positive lens in the second lens group nearest the object.

The above inequality (1) shows such a condition that the diverging group of lenses G1 can be thinned to reduce its entire diameter and length within a range acceptable with respect to aberration. If the upper limit in the inequality (1) is exceeded, the diverging group of lenses G1 would be thickened to increase both the diameter and length. Below the lower limit, the diverging group of lenses would be too thin and would lose freedom in aberrational correction. Particularly, it becomes difficult to correct the spherical and comatic aberrations.

The second inequality (2) shows such a condition that the diverging group of lenses G1 can effectively be corrected with respect to aberration and be made compact with regard to front lens diameter. Below the lower limit, the power of the negative meniscus lens L1 in the diverging group of lenses G1 nearest the side of the object would be increased too strongly. This is advantageous with respect to the compactness of the front lens diameter, but highly disadvantageous in the aberrational correction, leading to increased variations of astigmatism due to the field angle and increase of distortion toward the negative side. In addition, there will appear asymmetrical components of coma. Beyond the upper limit, it is advantageous with respect to the aberrational correction, but will be associated with increase of the front lens diameter. If the front lens diameter is limited by a filter used, a beam of incident rays also is limited, leading to eclipse. The close range cannot be shortened.

The third inequality (3) shows such a condition that the focal length of the positive lens in the second convergent group of lenses G2 nearest the side of the object can be established particularly with respect to correction of the spherical aberration. The second convergent group of lenses G2 is such that a positive lens is added forwardly of a so-called triplet type lens to correct the spherical aberration with regard to a short-distance object. It also is required that a non-focusing beam parallel to the optical axis is first diverged by the first lens group G1 and then emitted from the image side face of the positive lens L5 as the second element in the group of convergent lenses G2 parallel or slightly convergent relative to the optical axis. If the upper limit in the inequality (3) is exceeded, the power of the positive lens L4 in the convergent group of lenses nearest the side of the object would be decreased relative to the entire power of the convergent group of lenses G2. Positive and particularly higher order spherical aberration created at the diverging group of lenses G1 could not corrected, forming curves in the spherical aberration. Below the lower limit, the power of the positive lense L4 would be increased relative to the entire power of the convergent group of lenses producing a negative and particularly higher order spherical aberration. This also cannot be corrected.

The first, second, third and fourth embodiments of the present invention further satisfy the following inequalities:

$$1.20 < |f_1|/f_w < 1.55 \quad (4)$$

$$-3.5 < \frac{r_2 + r_1}{r_2 - r_1} < -2.2 \quad (5)$$

where $f_w$ is the focal length at the wide-angle end of the entire system;

$r_1$ is the radius of curvature at the object-side lens face of the negative meniscus lens in the first group of lenses G1; and $r_2$ is the radius of curvature at the image-side lens face of the negative meniscus lens in the first group of lenses G1.

The fourth inequality (4) defines the power of the diverging group of lenses G1 relative to the entire system. Above the upper limit or below the lower limit, the object of the present invention cannot be attained since the entire length is increased at the wide-angle or telephoto end. Below the lower limit, particularly, the diverging group of lenses G1 is highly affected by aberration to increase its power so that the variations in the curvature of field and astigmatism due to the field angle will be increased. If these variations were to be corrected, the distortion would be increased to the negative side and also the comatic aberration of marginal rays would abruptly be generated.

The fifth inequality (5) provides a condition relating to the configuration of the negative meniscus lens L1 for effectively correcting aberrations. Below the lower limit, the image-side face of the negative meniscus lens L1 will have an extremely large negative power so that both the spherical aberration and curvature of field will be increased to the positive side and at the same time the distortion will be increased to the negative side. These cannot be corrected. Above the upper limit, the object-side face of the negative meniscus lens L1 will conversely be decreased in curvature so that the incident angle of the beam on this lens face will be increased to raise the spherical aberration and the curvature of field toward the negative side. In addition, asymmetrical components in coma are created. This makes it difficult to correct the aberrations.

The above embodiments of the present invention still further satisfy the following relationship:

$$1/r_3 < 0 \qquad (6)$$

where $r_3$ is the radius of curvature at the object-side face of the lens L2.

The sixth inequality (6) defines the radius of curvature at the object-side lens face of the negative lens as the second element in the first group of lenses G1. Where the entire system is to be miniaturized by decreasing the focal lengths of the first and second groups of lenses G1 and G2 and yet by providing only three lenses to form the first group of lenses G1, each lens in the first group of lenses G1 will necessarily be relied on highly. This requires that each of the lens faces be most effectively shaped. In addition to the definition of the shape in the second lens, the inequality (6) means that an air lens formed between the above second lens and the first lens of the negative meniscus lens being convex on the opposite sides. The configuration of this air lens is efficient to correct off-axis aberrations if the first group of lenses G1 functions at the wide-angle side and also to correct on-axis aberrations if it functions at the telephoto side. If the following relationship:

$$-0.08 < 1/r_3 < 0 \qquad (7)$$

is further fulfilled in the condition (6), the above advantages can further be improved.

The fifth, sixth and seventh embodiments of the present invention further satisfy the following relationship:

$$0.1 < N_{52} - N_{51} \qquad (8)$$

$$0.78 < r_4/|f_1| < 0.95 \qquad (9)$$

$$1.7 < N_1, N_2, N_4 \qquad (10)$$

$$d_{13}/f_2 < 0.08 \qquad (11)$$

where $N_{51}$ is the refractive index of the positive lens element in the combined lens L5;

$N_{52}$ is the refractive index of the negative lens element in the combined lens L5;

$r_4$ is the radius of curvature at the image-side lens face of the second lens L2;

$N_1$ is the refractive index of the first lens L1;

$N_2$ is the refractive index of the second lens L2; p $N_4$ is the refractive index of the fourth lens L4;

$d_{13}$ is the thickness at the center of the sixth lens; and $f_2$ is the focal length in the second group of lenses G2.

The inequality (8) defines a difference in refractive index between the positive and negative lenses of the combined positive lens L5 in the second group of lenses G2. This combined lens L5 is not only efficient to correct chromatic aberrations due to the spherical aberration and magnification as described hereinbefore, but also permits to increasing the freedom of correction even with repect to aberrations in the reference wavelength in addition to chromatic aberration by providing said differential refractive index. If the condition deviates from the range of the inequality (8), the chromatic aberrations due to the spherical aberration and magification will insufficiently be corrected to make the correction of aberration relative to the reference wavelength difficult.

The inequality (9) defines the radius of curvature at the image-side lens face $r_4$ of the second lens L2 in the first group of lenses G1. This imageside lens face $r_4$ particularly contributes to the spherical aberration on the telephoto side in co-operation with an air gap produced between the imageside lens face and the third lens L3. Below the lower limit, the spherical aberration will be excessive on the positive side. Above the upper limit, the spherical aberration will be excessive on the negative side.

The inequality (10) defines a range of refractive index in the first and second lenses L1 and L2 of the first group of lenses G1 and a range of refractive index in the fourth positive lens L4 of the second group of lenses G2 nearest the object side. The refractive indexes of these lenses also must be increased to maintain F-number at about 3.5 through the entire region of variable power while miniaturizing the entire system and yet to well correct the curves of the spherical aberration as well as the comatic abberation off of the optical axis. If the condition deviates from the range of the inequality (10), it would be difficult to correct all the aberrations throughout the entire region of variable power very well.

The inequality (11) defines the central thickness of the sixth lens L6 as a negative lens in the second group of lenses G2. The sixth lens L6 is an important negative lens for thickening the second group of lenses G2 to correct aberrations. If this negative lens is not properly controlled, curves would be produced due to higher order aberrations in the curvature of field and due to the spherical aberration. Thus it can not be expected to correct aberrations very well. It has been proposed that the sixth lens L6 be made of glass having higher refractive index to increase the radius of curvature at the opposite lens faces and the central thickness of the sixth lens L6 in accordance with the fact that the radius of curvature can be increased by increasing the central thickness if the refracting power is invariable. However, the sixth lens L6 must be made of flint glass to correct the achromatic aberration. If the sixth lens L6 is too thick, therefore, the internal absorption thereof may deteriorate the spectral transmittance and color balance in the entire system. In consideration of such advantages and disadvantages and from the standpoint of miniaturization of the entire system, the inventors have found that the central thickness of the sixth lens L6 is optimum if it falls within such a range as defined by the inequality (11). If the condition is out of such a range, the spectral transmittance of the entire system would be reduced while at the same time it would be difficult to miniaturize the lens system.

The primary feature of the second through seventh embodiments according to the present invention resides in the construction of the fifth lens L5, that is, the combined positive lens in the second group of lenses G2.

The combined positive lens L5 is adopted for the following reasons: (1) It can receive, at the highest point, an on-axis beam diverged by the first group of lenses G1 having its negative refracting power, so that the chromatic aberration due to the spherical aberration can efficiently be corrected by the bonded lens boundary of the combined positive lens L5. (2) If the bonded lens boundary of the lens L5 is positioned in the second group of lenses G2 at a point farther apart from an aperture S, the chromatic aberration due to the magnification can more effectively be corrected. When the two-lens-group type zoom lens is studied in more detail, it has been found that although it is certain that the forwardmost lens in the second group of lenses G2 receives the on-axis beam at the highest point, the on-axis beam passed through this forwardmost lens becomes substantially parallel to the optical axis, so as to act less on the bonded lens boundary since the forwardmost lens is effective to convert the diverged beam into a converged beam. It also has been found that the chromatic aberration due to the spherical aberration can more efficiently be corrected by positioning said bonded lens boundary within a positive lens element next to the forwardmost positive lens in the second group of lenses G2 since marginal rays are converged by both the forwardmost lens and the object-side lens face of the positive lens next to the forwardmost lens, so that the angle of the converged rays relative to the optical axis will greatly be increased. Since the entire lens system is now being miniaturized, the second group of lenses G2 is necessarily miniaturized. Thus, the forwardmost lens in the second group of lenses G2 tends to be less different from a lens adjacent to the forwardmost lens with respect to the chromatic aberration due to the magnification. Such a difference can be neglected in comparison with the final or rearwardmost lens element in the second group of lenses G2. Therefore, the selection of glass material to be formed into the final lens element in the second group of lenses G2 becomes more important.

For the above reason, the second through seventh embodiments of the present invention are chracterized by the fact that the second lens element of the second group of lenses G2 starting from the side of the object is a combined positive lens of bonded positive and negative lens elements.

Each of the various embodiments according to the present invention provides a small-sized and high-performance zoom lens having its focal length in the order of 33 mm–70 mm and capable of being used with a 35 mm still camera.

Figure 2:
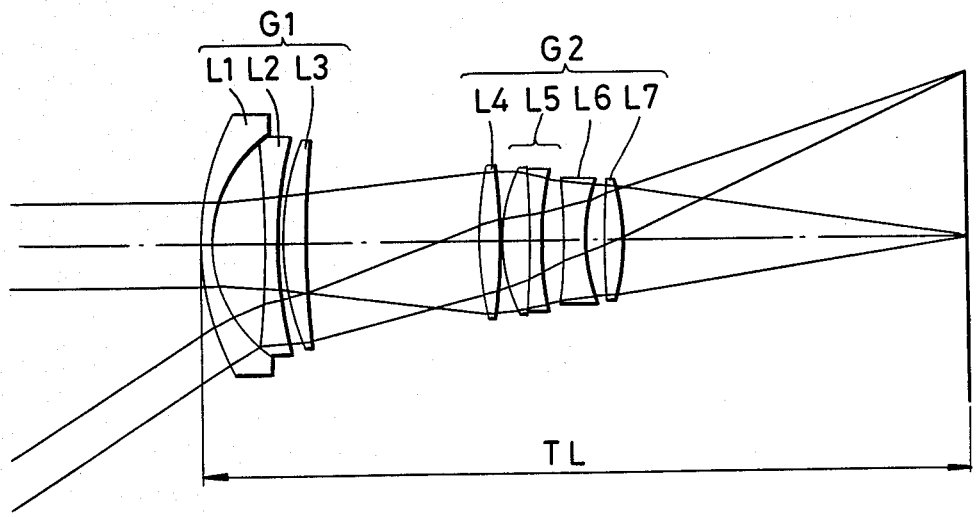
FIG. 2 is an optical diagram showing second, third and fourth embodiments of the lens system according to the present invention.
Figure 3:
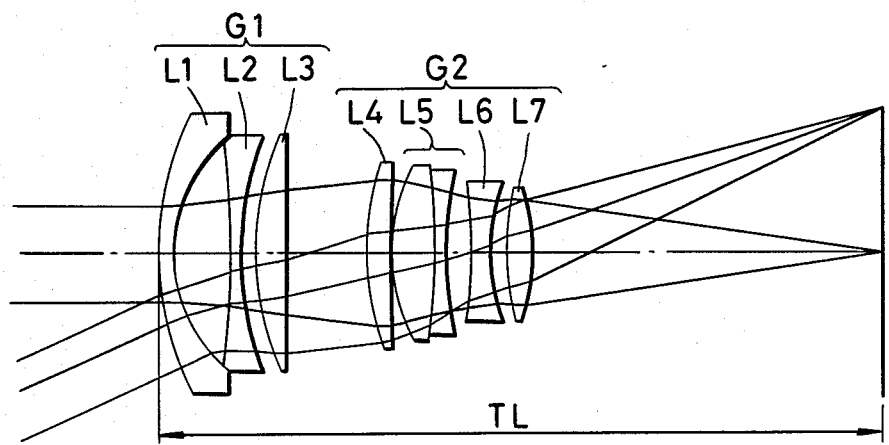
FIG. 3 is an optical diagram showing fifth and sixth embodiments of the lens system according to the present invention.
Figure 4:
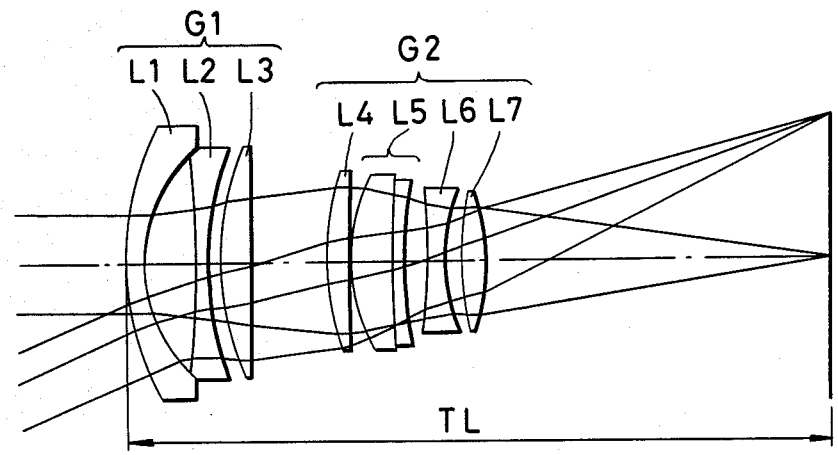
FIG. 4 is an optical diagram of a seventh embodiment of the lens system according to the present invention.

Table 1 shows data in the first embodiment of the present invention which as seen from FIG. 1, is the simplest construction comprising a plurality of single lenses. Tables 2 to 4 show data in the second to fourth embodiments of the present invention in each of which the second lens element or positive lens L5 in the convergent group of lenses is a combined acromatic lens as seen from FIG. 2. Tables 5 and 6 show data in the fifth and sixth embodiments of the present invention in each of which the fourth lens L4 is a positive meniscus lens as seen from FIG. 3. Table 7 shows data in the seventh embodiment of the present invention wherein the fourth lens L4 is a positive meniscus lens and also the bonded lens boundary of the lens L5 in the second group of lenses G2 is convex relative to the object side. In these tables, numerals listed in the leftwardmost column represent sequence from the object side. Refractive index and Abbe's number are measured relative to d-line ($\lambda=587.6$ nm). TL is the entire length of the lens system, that is, the distance between the apex of the forwardmost lens face and an image plane. Bf is back focus.

TABLE 1

(First Embodiment)
Focal Length f = 36.0–68.0
F - number 3.3–4.6

| No. | Radius of Curvature r | Central Thickness · Spacing d | Refractive Index n | Abbe's Number ν | |
|---|---|---|---|---|---|
| 1 | 37.777 | 1.600 | 1.72000 | 50.28 | $G_1$ |
| 2 | 17.183 | 7.000 | | | |
| 3 | −121.070 | 1.500 | 1.72000 | 50.28 | |
| 4 | 66.770 | 0.400 | | | |
| 5 | 28.976 | 3.500 | 1.75692 | 31.70 | |
| 6 | 90.637 | ($d_6$) | | | |
| 7 | 33.764 | 3.000 | 1.59319 | 67.87 | $G_2$ |
| 8 | −111.020 | 0.500 | | | |
| 9 | 20.711 | 4.600 | 1.59319 | 67.87 | |
| 10 | 61.312 | 3.100 | | | |
| 11 | −71.079 | 2.816 | 1.72825 | 28.34 | |
| 12 | 19.138 | 2.000 | | | |
| 13 | 114.810 | 3.000 | 1.72342 | 37.95 | |
| 14 | −31.399 | | | | |

| | | | |
|---|---|---|---|
| f | 36.0 | 50.0 | 68.0 |
| ($d_6$) | 23.640 | 10.029 | 0.765 |
| TL | 101.890 | 98.079 | 101.414 |

$f_1 = -50.0$  $f_{L1} = -45.249$
$f_2 = 35.0$  $f_{L4} = 43.985$
$f'_2 = 180.638$

TABLE 2

(Second Embodiment)
Focal Length f = 36.0–68.0
F - number 3.3–4.6

| No. | Radius of Curvature r | Central Thickness · Spacing d | Refractive Index n | Abbe's Number ν | |
|---|---|---|---|---|---|
| 1 | 41.000 | 1.600 | 1.77279 | 49.44 | $G_1$ |
| 2 | 16.950 | 7.000 | | | |
| 3 | −21.222 | 1.100 | 1.77279 | 49.44 | |
| 4 | 64.957 | 0.400 | | | |
| 5 | 31.292 | 3.500 | 1.75692 | 31.70 | |
| 6 | 3517.586 | ($d_6$) | | | |
| 7 | 34.572 | 3.000 | 1.62041 | 60.29 | $G_2$ |
| 8 | −92.493 | 0.100 | | | |
| 9 | 21.102 | 4.300 | 1.65160 | 58.54 | |
| 10 | −77.795 | 1.100 | 1.72342 | 37.95 | |
| 11 | 54.861 | 2.950 | | | |
| 12 | −60.052 | 2.850 | 1.72825 | 28.34 | |
| 13 | 18.725 | 2.450 | | | |
| 14 | 90.698 | 2.600 | 1.62004 | 36.35 | |
| 15 | −26.057 | | | | |

| | | | |
|---|---|---|---|
| f | 36.0 | 50.0 | 68.0 |
| ($d_6$) | 20.152 | 8.251 | 0.152 |
| TL | 98.859 | 97.537 | 103.037 |

$f_1 = -45.0$  $f_{L1} = -38.513$
$f_2 = 34.0$  $f_{L4} = 40.933$
$f'_2 = 216.241$

TABLE 3

(Third Embodiment)
Focal Length f = 36.0–68.0
F - number 3.3–4.6

| No. | Radius of Curvature r | Central Thickness · Spacing d | Refractive Index n | Abbe's Number ν | |
|---|---|---|---|---|---|
| 1 | 36.381 | 1.850 | 1.72000 | 50.28 | $G_1$ |
| 2 | 18.185 | 8.150 | | | |
| 3 | −118.308 | 1.300 | 1.72000 | 50.28 | |
| 4 | 53.830 | 0.450 | | | |

TABLE 3-continued (Third Embodiment)
Focal Length f = 36.0–68.0
F - number 3.3–4.6

| | | | | |
|---|---|---|---|---|
| 5 | 30.777 | 3.950 | 1.75692 | 31.70 |
| 6 | 158.841 | (d$_6$) | | |
| 7 | 55.458 | 2.650 | 1.62280 | 57.03 | G$_2$
| 8 | −96.637 | 0.100 | | |
| 9 | 20.948 | 4.300 | 1.65160 | 58.54 |
| 10 | −91.379 | 1.150 | 1.64831 | 33.77 |
| 11 | 74.715 | 3.300 | | |
| 12 | −68.527 | 2.950 | 1.72825 | 28.34 |
| 13 | 20.167 | 2.550 | | |
| 14 | 156.718 | 2.750 | 1.64831 | 33.77 |
| 15 | −27.568 | | | |

| f | 36.0 | 50.0 | 68.0 |
|---|---|---|---|
| (d$_6$) | 27.290 | 11.462 | 0.689 |
| TL | 108.364 | 101.954 | 103.290 |

$f_1 = -55.0$    $f_{L1} = -52.745$
$f_2 = 37.0$    $f_{L4} = 56.976$
$f'_2 = 107.290$

TABLE 4

(Fourth Embodiment)
Focal Length f = 36.0–68.0
F - number 3.3–4.6

| No. | Radius of Curvature r | Central Thickness · Spacing d | Refractive Index n | Abbe's Number ν | |
|---|---|---|---|---|---|
| 1 | 33.177 | 1.700 | 1.72000 | 50.28 | G$_1$ |
| 2 | 16.693 | 7.400 | | | |
| 3 | −113.680 | 1.200 | 1.72000 | 50.28 | |
| 4 | 49.947 | 0.400 | | | |
| 5 | 28.363 | 3.600 | 1.75692 | 31.70 | |
| 6 | 130.697 | (d$_6$) | | | |
| 7 | 60.918 | 2.500 | 1.62041 | 60.29 | G$_2$ |
| 8 | −66.782 | 0.100 | | | |
| 9 | 18.801 | 4.100 | 1.65160 | 58.54 | |
| 10 | −174.777 | 1.100 | 1.65128 | 38.20 | |
| 11 | 45.733 | 3.100 | | | |
| 12 | −70.642 | 2.800 | 1.72825 | 28.34 | |
| 13 | 19.170 | 2.400 | | | |
| 14 | 90.708 | 2.600 | 1.62004 | 36.35 | |
| 15 | −26.355 | | | | |

| f | 36.0 | 50.0 | 68.0 |
|---|---|---|---|
| (d$_6$) | 23.536 | 9.925 | 0.660 |
| TL | 101.983 | 98.172 | 101.507 |

$f_1 = -50.0$    $f_{L1} = -48.769$
$f_2 = 35.0$    $f_{L4} = 51.737$
$f'_2 = 110.641$

TABLE 5

(Fifth Embodiment)
Focal Length f = 36.0–68.8
F - number 3.55

| No. | Radius of Curvature r | Central Thickness · Spacing d | Refractive Index n | Abbe's Number ν | |
|---|---|---|---|---|---|
| 1 | 42.822 | 2.200 | 1.78797 | 47.53 | G$_1$ |
| 2 | 22.785 | 8.900 | | | |
| 3 | −156.923 | 1.400 | 1.79631 | 40.98 | |
| 4 | 48.909 | 2.100 | | | |
| 5 | 39.642 | 4.700 | 1.79504 | 28.57 | |
| 6 | 784.953 | (d$_6$) | | | |
| 7 | 37.062 | 3.800 | 1.77279 | 49.44 | G$_2$ |
| 8 | 1390.521 | 0.100 | | | |
| 9 | 27.353 | 6.900 | 1.71300 | 53.97 | |
| 10 | −150.000 | 1.700 | 1.86074 | 23.00 | |
| 11 | 62.072 | 3.900 | | | |
| 12 | −111.135 | 2.700 | 1.80368 | 33.81 | |
| 13 | 20.404 | 3.100 | | | |
| 14 | 49.528 | 3.900 | 1.66755 | 42.01 | |
| 15 | −36.085 | | | | |

| f | 36.000 | 51.600 | 68.800 |
|---|---|---|---|

TABLE 5-continued (Fifth Embodiment)
Focal Length f = 36.0–68.8
F - number 3.55

| (d$_6$) | 33.896 | 12.893 | 0.776 |
|---|---|---|---|
| TL | 123.624 | 113.106 | 112.539 |

$f_1 = -61.000$    $f_{L1} = -64.940$
$f_2 = 41.000$    $f_{L4} = 49.212$
$f'_2 = 240.361$

TABLE 6

(Sixth Embodiment)
Focal Length f = 36.0–68.8
F - number 3.55

| No. | Radius of Curvature r | Central Thickness · Spacing d | Refractive Index n | Abbe's Number ν | |
|---|---|---|---|---|---|
| 1 | 40.707 | 2.200 | 1.79668 | 45.52 | G$_1$ |
| 2 | 22.266 | 8.600 | | | |
| 3 | −148.707 | 1.400 | 1.79631 | 40.98 | |
| 4 | 48.256 | 2.119 | | | |
| 5 | 38.995 | 4.700 | 1.79504 | 28.57 | |
| 6 | 673.048 | (d$_6$) | | | |
| 7 | 37.932 | 3.200 | 1.78797 | 47.53 | G$_2$ |
| 8 | 645.844 | 0.100 | | | |
| 9 | 26.345 | 7.086 | 1.71300 | 53.97 | |
| 10 | −130.000 | 1.500 | 1.86074 | 23.00 | |
| 11 | 64.526 | 3.807 | | | |
| 12 | −128.042 | 2.605 | 1.80368 | 33.81 | |
| 13 | 20.023 | 3.005 | | | |
| 14 | 50.958 | 3.200 | 1.66755 | 42.01 | |
| 15 | −35.962 | | | | |

| f | 36.000 | 51.600 | 68.000 |
|---|---|---|---|
| (d$_6$) | 32.390 | 12.235 | 0.607 |
| TL | 119.994 | 110.239 | 110.078 |

$f_1 = -60.000$    $f_{L1} = -65.140$
$f_2 = 40.000$    $f_{L4} = 51.024$
$f'_2 = 192.879$

TABLE 7

(Seventh Embodiment)
Focal Length f = 36.0–68.8
F - number 3.55

| No. | Radius of Curvature r | Central Thickness · Spacing d | Refractive Index n | Abbe's Number ν | |
|---|---|---|---|---|---|
| 1 | 41.184 | 2.200 | 1.78797 | 47.53 | G$_1$ |
| 2 | 22.261 | 8.600 | | | |
| 3 | −149.671 | 1.400 | 1.79631 | 40.98 | |
| 4 | 47.868 | 2.120 | | | |
| 5 | 38.994 | 4.500 | 1.79504 | 28.57 | |
| 6 | 769.489 | (d$_6$) | | | |
| 7 | 39.513 | 3.200 | 1.78797 | 47.53 | G$_2$ |
| 8 | 1084.914 | 0.000 | | | |
| 9 | 24.621 | 7.047 | 1.65160 | 58.54 | |
| 10 | 900.000 | 1.500 | 1.86074 | 23.00 | |
| 11 | 65.977 | 3.798 | | | |
| 12 | −122.759 | 2.590 | 1.80458 | 25.49 | |
| 13 | 19.809 | 2.969 | | | |
| 14 | 50.558 | 3.200 | 1.67270 | 32.16 | |
| 15 | −36.663 | | | | |

| f | 36.000 | 51.600 | 68.800 |
|---|---|---|---|
| (d$_6$) | 32.449 | 12.293 | 0.666 |
| TL | 119.645 | 109.889 | 109.729 |

$f_1 = -60.000$    $f_{L1} = -64.806$
$f_2 = 40.000$    $f_{L4} = 51.971$
$f'_2 = 183.625$

Tables 8, 9 and 10 show coefficients of third-order aberration under the minimum focal length state in the fifth to seventh embodiments of the present invention. These values were calculated by standardizing the focal length of the entire system into one ("1"). In these tables 8 to 10, "I" represents coefficients of third-order averration in the spherical aberration; "II" coefficients of third-order aberration in the comatic aberration; "III" coefficients of third-order aberration in the astigmatism; "IV" coefficients of third-order aberration in the curvature of sagittal image surface and "V" coefficients of third-order aberration in the distortion.

TABLE 8

(Coefficients of Third-order Aberration in Fifth Embodiment)

| | I | II | III | IV | V |
|---|---|---|---|---|---|
| 1 | 0.1465 | 0.0442 | 0.0134 | 0.3839 | 0.1160 |
| 2 | −3.2781 | 1.1962 | −0.4365 | −1.1328 | 0.4134 |
| 3 | 0.0318 | 0.0756 | 0.1797 | 0.0780 | 0.1856 |
| 4 | −6.8076 | 1.4692 | −0.3171 | −0.6434 | 0.1388 |
| 5 | 9.6708 | −2.3135 | 0.5534 | 0.9557 | −0.2286 |
| 6 | −0.2214 | −0.1581 | −0.1129 | −0.1332 | −0.0951 |
| 7 | 8.3172 | 1.1047 | 0.1467 | 0.5702 | 0.0757 |
| 8 | 0.4060 | −0.3694 | 0.3361 | 0.3248 | −0.2955 |
| 9 | 0.3559 | 0.0979 | 0.0269 | 0.5747 | 0.1580 |
| 10 | −1.8723 | 0.4937 | −0.1302 | −0.1413 | 0.0373 |
| 11 | 0.8298 | −0.7620 | 0.6997 | 0.4314 | −0.3961 |
| 12 | −6.2972 | 2.2730 | −0.8205 | −0.9648 | 0.3483 |
| 13 | −6.4355 | −2.4664 | −0.9452 | −1.7314 | −0.6635 |
| 14 | 1.0674 | 0.7710 | 0.5569 | 0.8478 | 0.6124 |
| 15 | 5.7189 | −1.1787 | 0.2429 | 0.6423 | −0.1324 |
| Entire System | 1.6321 | 0.2775 | −0.0067 | 0.0618 | 0.2743 |

TABLE 9

(Coefficients of Third-order Aberration in Sixth Embodiment)

| | I | II | III | IV | V |
|---|---|---|---|---|---|
| 1 | 0.1707 | 0.0449 | 0.0118 | 0.4040 | 0.1064 |
| 2 | −3.4163 | 1.2019 | −0.4228 | −1.1398 | 0.4010 |
| 3 | 0.0283 | 0.0724 | 0.1853 | 0.0780 | 0.1998 |
| 4 | −6.9573 | 1.4142 | −0.2875 | −0.6182 | 0.1257 |
| 5 | 9.9476 | −2.2565 | 0.5119 | 0.9207 | −0.2089 |
| 6 | −0.2385 | −0.1664 | −0.1161 | −0.1398 | −0.0975 |
| 7 | 7.8222 | 1.1147 | 0.1588 | 0.5771 | 0.0822 |
| 8 | 0.2372 | −0.2614 | 0.2881 | 0.2635 | −0.2904 |
| 9 | 0.7630 | 0.1878 | 0.0462 | 0.6150 | 0.1514 |
| 10 | −1.9447 | 0.5074 | −0.1324 | −0.1452 | −0.0379 |
| 11 | 0.9201 | −0.8113 | 0.7154 | 0.4573 | −0.4033 |
| 12 | −5.8851 | 2.2049 | −0.8261 | −0.9514 | 0.3564 |
| 13 | −6.3753 | −2.4347 | −0.9298 | −0.7309 | −0.6610 |
| 14 | 0.9303 | 0.6974 | 0.5228 | 0.8056 | 0.6040 |
| 15 | 5.6699 | 1.2407 | 0.2715 | 0.6722 | −0.1471 |
| Entire System | 1.6721 | 0.2747 | −0.0028 | 0.0682 | 0.2566 |

TABLE 10

(Coefficients of Third-order Aberration in Seventh Embodiment)

| | I | II | III | IV | V |
|---|---|---|---|---|---|
| 1 | 0.1646 | 0.0457 | 0.0127 | 0.3979 | 0.1106 |
| 2 | −3.4304 | 1.2054 | −0.4236 | −1.1363 | 0.3993 |
| 3 | 0.0294 | 0.0738 | 0.1853 | 0.0786 | 0.1975 |
| 4 | −7.1021 | 1.4571 | −0.2989 | −0.6323 | 0.1297 |
| 5 | 10.0792 | −2.2919 | 0.5212 | 0.9301 | −0.2115 |
| 6 | −0.2319 | −0.1651 | −0.1175 | −0.1382 | −0.0984 |
| 7 | 7.2548 | 1.0844 | 0.1621 | 0.5636 | 0.0842 |
| 8 | 0.2518 | −0.2683 | 0.2858 | 0.2712 | −0.2889 |
| 9 | 1.3611 | 0.2683 | 0.2858 | 0.2712 | 0.2889 |
| 10 | −1.2808 | 0.4410 | −0.1518 | −0.1491 | 0.0513 |
| 11 | 1.0693 | −0.8878 | 0.7371 | 0.4847 | −0.4024 |
| 12 | −6.3417 | 2.3103 | −0.8417 | −0.9724 | 0.3543 |
| 13 | −6.5470 | −2.4773 | −0.9374 | −1.7477 | −0.6613 |
| 14 | 0.9454 | 0.7046 | 0.5251 | 0.8115 | 0.6048 |
| 15 | 5.5305 | −1.2386 | 0.2774 | 0.6723 | −0.1506 |
| Entire System | 1.7524 | 0.2793 | −0.0041 | 0.0709 | 0.2525 |

As seen from these tables 8, 9 and 10, the coefficients of aberration are sufficiently small in the entire system. The tenth lens face underlined in each of the tables corresponds to the bonded lens boundary in the second group of lenses G2 as described hereinbefore. Studying the coefficients of third-order aberration in the tenth lens face, it has been found that the coefficients listed in the columns "I" (spherical aberration) and "II" (comatic aberration) are relatively large. This means that this bonded lens boundary highly acts on the reference rays as described hereinbefore.

We claim:

1. A zoom lens comprising, in sequence starting from the side of an object, a first diverging group of lenses and a second converging group of lenses, said first and second groups of lenses being movable along the optical axis to perform zooming, said first group of lenses comprising, in sequence starting from the object side, a negative meniscus lens having its convex surface faced to the object side, a negative lens being concave on the opposite sides and a positive lens having its surface of larger curvature faced to the object side, and said second group of lenses comprising, in sequence starting from the object side, a positive lens, a positive and achromatic lens including positive and negative lens elements, a negative lens having its surface of larger curvature faced to the image side and a positive lens, said zoom lens satisfying the following relationship:

$$1.20 < |f_1|/f_w < 1.55$$

where $f_1$ is the focal length of said first group of lenses; and
$f_w$ is the focal length of the entire zoom lens system at its wide-angle end, and said zoom lens also satisfying the following relationships:

$$0.25 < D_1/|f_1| < 0.32$$

$$0.70 < f_{L1}/f_1 < 1.2$$

$$0.1 < f_{L4}/f_2 < 0.6$$

$$-3.5 < \frac{r_2 + r_1}{r_2 - r_1} < -2.2$$

$$-0.08 < 1/r_3 < 0$$

where $D_1$ is the distance between the object-side face of said negative meniscus lens and the image surface of said positive lens in said first group of lenses;
$f_{L1}$ is the focal length of the negative meniscus lens in said first group of lenses;
$f_{L4}$ is the focal length of the positive lens in said second group of lenses nearest the object side;
$f_2$ is the combined focal length of three lenses other than the positive lens nearest the object side in said second group of lenses;
$r_1$ is the radius of curvature at the object-side lens face of said negative meniscus lens in said first group of lenses;
$r_2$ is the radius of curvature at the image-side lens face of said negative meniscus lens in said first group of lenses; and
$r_3$ is the radius of curvature at the object-side lens face of the second negative lens in said second group of lenses in sequence starting from the object side.

2. A zoom lens as defined in claim 1 wherein said second group of lenses consists essentially of, in sequence starting from the object side, said positive lens, said positive and achromatic lens, said negative lens and said positive lens.

3. A zoom lens as defined in claim 2 wherein said positive and achromatic lens in said second group of lenses comprises, in sequence starting from the object side, a positive lens and a negative lens which are bonded together.

4. A zoom lens as defined in claim 3 wherein said zoom lens includes the following specifications and data:

| | Focal Length f = 36.0–68.0 F - number 3.3–4.6 | | | | |
|---|---|---|---|---|---|
| No. | Radius of Curvature r | Central Thickness · Spacing d | Refractive Index n | Abbe's Number $\nu$ | |
| 1 | 41.000 | 1.600 | 1.77279 | 49.44 | $G_1$ |
| 2 | 16.950 | 7.000 | | | |
| 3 | −21.222 | 1.100 | 1.77279 | 49.44 | |
| 4 | 64.957 | 0.400 | | | |
| 5 | 31.292 | 3.500 | 1.75692 | 31.70 | |
| 6 | 3517.586 | $(d_6)$ | | | |
| 7 | 34.572 | 3.000 | 1.62041 | 60.29 | $G_2$ |
| 8 | −92.493 | 0.100 | | | |
| 9 | 21.102 | 4.300 | 1.65160 | 58.54 | |
| 10 | −77.795 | 1.100 | 1.72342 | 37.95 | |
| 11 | 54.861 | 2.950 | | | |
| 12 | −60.052 | 2.850 | 1.72825 | 28.34 | |
| 13 | 18.725 | 2.450 | | | |
| 14 | 90.698 | 2.600 | 1.62004 | 36.35 | |
| 15 | −26.057 | | | | |
| f | 36.0 | 50.0 | 68.0 | | |
| $(d_6)$ | 20.152 | 8.251 | 0.152 | | |
| TL | 98.859 | 97.537 | 103.037 | | |

$f_1 = -45.0$  $f_{L1} = -38.513$
$f_2 = 34.0$  $f_{L4} = 40.933$
$f'_2 = 216.241$

5. A zoom lens as defined in claim 3 wherein said zoom lens includes the following specifications and data:

| | Focal Length f = 36.0–68.0 F - number 3.3–4.6 | | | | |
|---|---|---|---|---|---|
| No. | Radius of Curvature r | Central Thickness · Spacing d | Refractive Index n | Abbe's Number $\nu$ | |
| 1 | 36.381 | 1.850 | 1.72000 | 50.28 | $G_1$ |
| 2 | 18.185 | 8.150 | | | |
| 3 | −118.308 | 1.300 | 1.72000 | 50.28 | |
| 4 | 53.830 | 0.450 | | | |
| 5 | 30.777 | 3.950 | 1.75692 | 31.70 | |
| 6 | 158.841 | $(d_6)$ | | | |
| 7 | 55.458 | 2.650 | 1.62280 | 57.03 | $G_2$ |
| 8 | −96.637 | 0.100 | | | |
| 9 | 20.948 | 4.300 | 1.65160 | 58.54 | |
| 10 | −91.379 | 1.150 | 1.64831 | 33.77 | |
| 11 | 74.715 | 3.300 | | | |
| 12 | −68.527 | 2.950 | 1.72825 | 28.34 | |
| 13 | 20.167 | 2.550 | | | |
| 14 | 156.718 | 2.750 | 1.64831 | 33.77 | |
| 15 | −27.568 | | | | |
| f | 36.0 | 50.0 | 68.0 | | |
| $(d_6)$ | 27.290 | 11.462 | 0.689 | | |
| TL | 108.364 | 101.954 | 103.290 | | |

$f_1 = -55.0$  $f_{L1} = -52.745$
$f_2 = 37.0$  $f_{L4} = 56.976$
$f'_2 = 107.290$

6. A zoom lens as defined in claim 3 wherein said zoom lens includes the following specifications and data:

| | Focal Length f = 36.0–68.0 F - number 3.3–4.6 | | | | |
|---|---|---|---|---|---|
| No. | Radius of Curvature r | Central Thickness · Spacing d | Refractive Index n | Abbe's Number $\nu$ | |
| 1 | 33.177 | 1.700 | 1.72000 | 50.28 | $G_1$ |
| 2 | 16.693 | 7.400 | | | |
| 3 | −113.680 | 1.200 | 1.72000 | 50.28 | |
| 4 | 49.947 | 0.400 | | | |
| 5 | 28.363 | 3.600 | 1.75692 | 31.70 | |
| 6 | 130.697 | $(d_6)$ | | | |
| 7 | 60.918 | 2.500 | 1.62041 | 60.29 | $G_2$ |
| 8 | −66.782 | 0.100 | | | |
| 9 | 18.801 | 4.100 | 1.65160 | 58.54 | |
| 10 | −174.777 | 1.100 | 1.65128 | 38.20 | |
| 11 | 45.733 | 3.100 | | | |
| 12 | −70.642 | 2.800 | 1.72825 | 28.34 | |
| 13 | 19.170 | 2.400 | | | |
| 14 | 90.708 | 2.600 | 1.62004 | 36.35 | |
| 15 | −26.355 | | | | |
| f | 36.0 | 50.0 | 68.0 | | |
| $(d_6)$ | 23.536 | 9.925 | 0.660 | | |
| TL | 101.983 | 98.172 | 101.507 | | |

$f_1 = -50.0$  $f_{L1} = -48.769$
$f_2 = 35.0$  $f_{L4} = 51.737$
$f'_2 = 110.641$

7. A zoom lens comprising, in sequence starting from the side of an object, a first group of lenses having a negative refracting power and a second group of lenses having a positive refracting power, the spacing between said first and second groups of lenses being variable to change the focal length of the entire system, said first group of lenses comprising, in sequence starting from the object side, a first negative meniscus lens having its convex surface faced to the object side, a second negative lens being concave on the opposite sides and a third positive lens having its surface of larger curvature faced to the object side, and said second group of lenses comprising, in sequence starting from the object side, a fourth positive lens, a fifth positive lens, a sixth negative lens bonded to said fifth lens, a seventh negative lens and an eighth positive lens, said zoom lens satisfying the following relationship:

$1.7 < N_4$ where $N_4$ is the refractive index of the fourth lens, and said zoom lens also satisfying the following relationships:

$0.25 < D_1/|f_1| < 0.32$ $0.70 < f_{L1}/f_1 < 1.2$ $0.1 < f_{L4}/f'_2 < 0.6$ $0.1 < N_{52} - N_{51}$ $0.78 < r_4/|f_1| < 0.95$ $1.7 < N_1, N_2$ $d_{13}/f_2 < 0.08$ where $D_1$ is the distance between the object-side face of said negative meniscus lens and the image surface of said positive lens in said first group of lenses;

$f_1$ is the focal length of said first group of lenses;

$f_{L1}$ is the focal length of the first negative meniscus lens in said first group of lenses;

$f_{L4}$ is the focal length of the fourth positive lens in said second group of lenses nearest the object side;

$f'_2$ is the combined focal length of three lenses other than the fourth positive in said second group of lenses;

$N_{51}$ is the refractive index of the fifth positive lens;

$N_{52}$ is the refractive index of the sixth negative lens;

$r_4$ is the radius of curvature at the image-side lens face of the second negative lens;

$N_1$ is the refractive index of the first negative meniscus lens;

$N_2$ is the refractive index of the second negative meniscus lens; and $d_{13}$ is the central thickness of the fifth positive lens.

8. A zoom lens as defined in claim 7 wherein said third positive lens is a meniscus lens having its convex surface faced to the object side.

9. A zoom lens as defined in claim 7 wherein said second group of lenses consists essentially of said fourth positive lens, said fifth positive lens, said sixth negative lens, said seventh negative lens and said eighth positive lens.

10. A zoom lens as defined in claim 9 wherein said zoom lens includes the following specifications and data:

| | Focal Length f = 36.0–68.8 F - number 3.55 | | | | |
|---|---|---|---|---|---|
| No. | Radius of Curvature r | Central Thickness · Spacing d | Refractive Index n | Abbe's Number ν | |
| 1 | 42.822 | 2.200 | 1.78797 | 47.53 | $G_1$ |
| 2 | 22.785 | 8.900 | | | |
| 3 | −156.923 | 1.400 | 1.79631 | 40.98 | |
| 4 | 48.909 | 2.100 | | | |
| 5 | 39.642 | 4.700 | 1.79504 | 28.57 | |
| 6 | 784.953 | (d$_6$) | | | |
| 7 | 37.062 | 3.800 | 1.77279 | 49.44 | $G_2$ |
| 8 | 1390.521 | 0.100 | | | |
| 9 | 27.353 | 6.900 | 1.71300 | 53.97 | |
| 10 | −150.000 | 1.700 | 1.86074 | 23.00 | |
| 11 | 62.072 | 3.900 | | | |
| 12 | −111.135 | 2.700 | 1.80368 | 33.81 | |
| 13 | 20.404 | 3.100 | | | |
| 14 | 49.528 | 3.900 | 1.66755 | 42.01 | |
| 15 | −36.085 | | | | |
| f | 36.000 | 51.600 | 68.800 | | |
| (d$_6$) | 33.896 | 12.893 | 0.776 | | |
| TL | 123.624 | 113.106 | 112.539 | | |
| $f_1 = -61.000$ | | $f_{L1} = -64.940$ | | | |
| $f_2 = 41.000$ | | $f_{L4} = 49.212$ | | | |
| $f'_2 = 240.361$ | | | | | |

11. A zoom lens as defined in claim 9 wherein said zoom lens includes the following specifications and data:

| | Focal Length f = 36.0–68.8 F - number 3.55 | | | | |
|---|---|---|---|---|---|
| No. | Radius of Curvature r | Central Thickness · Spacing d | Refractive Index n | Abbe's Number ν | |
| 1 | 40.707 | 2.200 | 1.79668 | 45.52 | $G_1$ |
| 2 | 22.266 | 8.600 | | | |
| 3 | −148.707 | 1.400 | 1.79631 | 40.98 | |
| 4 | 48.256 | 2.119 | | | |
| 5 | 38.995 | 4.700 | 1.79504 | 28.57 | |
| 6 | 673.048 | (d$_6$) | | | |
| 7 | 37.932 | 3.200 | 1.78797 | 47.53 | $G_2$ |
| 8 | 645.844 | 0.100 | | | |
| 9 | 26.345 | 7.086 | 1.71300 | 53.97 | |
| 10 | −130.000 | 1.500 | 1.86074 | 23.00 | |
| 11 | 64.526 | 3.807 | | | |
| 12 | −128.042 | 2.605 | 1.80368 | 33.81 | |
| 13 | 20.023 | 3.005 | | | |
| 14 | 50.958 | 3.200 | 1.66755 | 42.01 | |
| 15 | −35.962 | | | | |
| f | 36.000 | 51.600 | 68.000 | | |
| (d$_6$) | 32.390 | 12.235 | 0.607 | | |
| TL | 119.994 | 110.239 | 110.078 | | |
| $f_1 = -60.000$ | | $f_{L1} = -65.140$ | | | |
| $f_2 = 40.000$ | | $f_{L4} = 51.024$ | | | |
| $f'_2 = 192.879$ | | | | | |

12. zoom lens as defined in claim 9 whrein said zoom lens includes the following specifications and data:

| | Focal Length f = 36.0–68.8 F - number 3.55 | | | | |
|---|---|---|---|---|---|
| No. | Radius of Curvature r | Central Thickness · Spacing d | Refractive Index n | Abbe's Number ν | |
| 1 | 41.184 | 2.200 | 1.78797 | 47.53 | $G_1$ |
| 2 | 22.261 | 8.600 | | | |
| 3 | −149.671 | 1.400 | 1.79631 | 40.98 | |
| 4 | 47.868 | 2.120 | | | |
| 5 | 38.994 | 4.500 | 1.79504 | 28.57 | |
| 6 | 769.489 | (d$_6$) | | | |
| 7 | 39.513 | 3.200 | 1.78797 | 47.53 | $G_2$ |
| 8 | 1084.914 | 0.000 | | | |
| 9 | 24.621 | 7.047 | 1.65160 | 58.54 | |
| 10 | 900.000 | 1.500 | 1.86074 | 23.00 | |
| 11 | 65.977 | 3.798 | | | |
| 12 | −122.759 | 2.590 | 1.80458 | 25.49 | |
| 13 | 19.809 | 2.969 | | | |
| 14 | 50.558 | 3.200 | 1.67270 | 32.16 | |
| 15 | −36.663 | | | | |
| f | 36.000 | 51.600 | 68.800 | | |
| (d$_6$) | 32.449 | 12.293 | 0.666 | | |
| TL | 119.645 | 109.889 | 109.729 | | |
| $f_1 = -60.000$ | | $f_{L1} = -64.806$ | | | |
| $f_2 = 40.000$ | | $f_{L4} = 51.971$ | | | |
| $f'_2 = 183.625$ | | | | | |

13. A zoom lens comprising, in sequence starting from the side of an object, a first diverging group of lenses and a second converging group of lenses, said first and second groups of lenses being movable along the optical axis to perform zooming, said first group of lenses comprising, in sequence starting from the object side, a negative meniscus lens having its convex surface faced to the object side, a negative lens being concave on the opposite sides and a positive lens having its surface of larger curvature faced to the object side, and said second group of lenses comprising, in sequence starting from the object side, a positive lens convex on the opposite sides, a positive lens, a negative lens having its surface of larger curvature faced to the image side and a positive lens, said zoom lens satisfying the following relationship:

$$1.20 < |f_1|/f_w < 1.55$$

where $f_w$ is the focal length of the entire zoom lens system at its wide-angle end; and $f_1$ is the focal length of the first group of lenses, and said zoom lens also satisfying the following relationships:

$$0.25 < D_1/|f_1| < 0.32$$

$$0.70 < f_{L1}/f_1 < 1.2$$

$$0.1 < f_{L4}/f_2 < 0.6$$

$$-3.5 < \frac{r_2 + r_1}{r_2 - r_1} < -2.2$$

$$-0.08 < 1/r_3 < 0$$

where $D_1$ is the distance between the object-side face of said negative meniscus lens and the image surface of said positive lens in said first group of lenses;

$F_{L1}$ is the focal length of the negative meniscus lens in said first group of lenses;

$f_{L4}$ is the focal length of the positive lens in said second group of lenses nearest the object side;

$f'_2$ is the combined focal length of three lenses other than the positive lens nearest the object side in said second group of lenses;

$r_1$ is the radius of curvature at the object-side lens face of said negative meniscus lens in said first group of lenses;

$r_2$ is the radius of curvature at the image-side lens face of said negative meniscus lens in said first group of lenses; and $r_3$ is the radius of curvature at the object-side lens face of the second negative lens in said second group of lenses in sequence starting from the object side.

14. A zoom lens as defined in claim 13 wherein said second group of lenses consists essentially of, in sequence starting from the object side, said positive lens which is convex on the opposite sides, said positive lens, said negative lens having its surface of larger curvature faced to the side of the image and said positive lens.

* * * * *